US012613759B2

(12) United States Patent
Mccollum et al.

(10) Patent No.: US 12,613,759 B2
(45) Date of Patent: Apr. 28, 2026

(54) METHODS AND SYSTEMS FOR ENHANCED CLUSTER HEALTH MONITORING AND UNHEALTHY NODE DETECTION THROUGH DROP OUT-ACCUMULATION TECHNIQUES

(71) Applicant: Penguin Computing, Inc., Fremont, CA (US)

(72) Inventors: Nicholas Mccollum, Decatur, AL (US); Kevin Manalo, Saint Johns, FL (US)

(73) Assignee: Penguin Computing, Inc., Fremont, CA (US)

( * ) Notice: Subject to any disclaimer, the term of this patent is extended or adjusted under 35 U.S.C. 154(b) by 245 days.

(21) Appl. No.: 18/604,417

(22) Filed: Mar. 13, 2024

(65) Prior Publication Data
US 2025/0291665 A1     Sep. 18, 2025

(51) Int. Cl.
*G06F 11/00* (2006.01)
*G06F 11/07* (2006.01)

(52) U.S. Cl.
CPC ........ *G06F 11/076* (2013.01); *G06F 11/0709* (2013.01); *G06F 11/0793* (2013.01)

(58) Field of Classification Search
CPC . G06F 11/076; G06F 11/0709; G06F 11/0793
USPC ....................................................... 714/1–57
See application file for complete search history.

(56) References Cited

U.S. PATENT DOCUMENTS

| | | | | |
|---|---|---|---|---|
| 2004/0230866 A1* | 11/2004 | Yates | .................... | G06F 11/273 |
| | | | | 714/25 |
| 2011/0010585 A1* | 1/2011 | Bugenhagen | ........... | H04L 43/50 |
| | | | | 714/E11.178 |
| 2012/0226943 A1* | 9/2012 | Alderman | ........... | G06F 11/0709 |
| | | | | 714/E11.002 |
| 2014/0269342 A1* | 9/2014 | Baron | .................... | H04L 43/50 |
| | | | | 370/242 |
| 2023/0362178 A1* | 11/2023 | Pandey | ................. | H04L 41/064 |

* cited by examiner

*Primary Examiner* — Sarai E Butler
(74) *Attorney, Agent, or Firm* — Padowithz Alce; Alce PLLC

(57) ABSTRACT

A system and method for enhanced cluster health includes implementing an assessment interface command communication with an administrative computing node of a cluster of computing nodes, identifying a quora of computing nodes; signaling, via the assessment interface, the administrative computing node to cause the quora of computing nodes to execute the assessment of health, wherein executing the assessment of health includes: defining a plurality of distinct pairs of computing nodes, implementing a bi-directional testing by each pair of computing nodes of the plurality of distinct pairs, evaluating bi-directional testing data obtained based on the execution of the assessment of health of the quora of computing nodes, classifying a computing node of the quora of computing nodes as unhealthy when the evaluation indicates that a subset of the bi-directional testing data associated with the computing node fails to satisfy benchmark node performance values.

20 Claims, 7 Drawing Sheets

200

Configuring Node Health Assessment Parameters S210

Configuring a Node Health Assessment S220

Executing a Node Health Assessment of a Quora of Computing Nodes S230

Identifying Healthy or Unhealthy Computing Nodes S240

Handling Non-Performant or Unhealthy Computing Nodes S250

<u>200</u>

Configuring Node Health Assessment Parameters <u>S210</u>

Configuring a Node Health Assessment <u>S220</u>

Executing a Node Health Assessment of a Quora of Computing Nodes <u>S230</u>

Identifying Healthy or Unhealthy Computing Nodes <u>S240</u>

Handling Non-Performant or Unhealthy Computing Nodes <u>S250</u>

FIGURE 2

METHODS AND SYSTEMS FOR ENHANCED CLUSTER HEALTH MONITORING AND UNHEALTHY NODE DETECTION THROUGH DROP OUT-ACCUMULATION TECHNIQUES

TECHNICAL FIELD

This invention relates generally to the computer cluster management field, and more specifically to new and useful systems and methods for conducting health checks of and detecting unhealthy computing nodes in the computer cluster management field.

BACKGROUND

Traditional methods for ensuring the integrity and performance of a cluster of computers often rely heavily on self-reporting mechanisms from the hardware components or computers within the cluster. These methods await error signals such as logs, messages, or other indications from the hardware to identify issues. However, this approach is insufficient as it fails to detect problems that do not self-report, leading to undiagnosed issues that degrade cluster performance.

Some systems may employ single-point health checks provided by server hardware vendors, which monitor the status of a single computing node and its components. These systems are limited as they depend on the hardware's ability to recognize and communicate its own failures. Such reliance on self-reporting not only overlooks silent failures but also neglects the health of the network interconnected components. Given that modern GPU servers and similar servers are increasingly connected via high-speed fiber-optic networks, direct attach copper, and/or the like, this oversight can result in unacknowledged bottlenecks and faults within the cluster's communication infrastructure.

The technology introduced herein addresses the aforementioned limitations by providing a robust health check framework that actively tests nodes bi-directionally against their peers within the cluster. At least this innovative approach ensures the reliable detection of faulty computing nodes within a cluster without depending on vendor-specific, single-server health checks. By facilitating indirect testing of the network interconnects, the invention comprehensively evaluates the health of the entire cluster of computers, including various network components of the cluster of computers. Consequently, the inventions described herein offer improved systems and methods for maintaining optimal cluster performance and reliability.

SUMMARY OF THE INVENTION(S)

In one embodiment, a method for enhanced cluster health management and detection of unhealthy computing nodes, the method including implementing an assessment interface in operable command communication with an administrative computing node of a cluster of computing nodes, the administrative computing node being network to computing nodes of the cluster of computing nodes for implementing an assessment of health; identifying a quora of computing nodes of the cluster of computing nodes, the quora of computing nodes including a subset of computing nodes within the cluster of computing nodes having hardware components that are homogeneous; signaling, via the assessment interface, the administrative computing node to cause the quora of computing nodes to execute the assessment of health, wherein executing the assessment of health includes: defining, for each test cycle of a plurality of test cycles of the assessment of health, a plurality of distinct pairs of computing nodes from the quora of computing nodes, wherein each test cycle of the assessment of health assesses a different combination of paired computing nodes of the plurality of distinct pairs of computing nodes; implementing a bi-directional testing by each pair of computing nodes of the plurality of distinct pairs of computing nodes; evaluating bi-directional testing data obtained based on the execution of the assessment of health of the quora of computing nodes; classifying at least one computing node of the quora of computing nodes as unhealthy when the evaluation indicates that a subset of the bi-directional testing data associated with the at least one computing node fails to satisfy one or more benchmark node performance values; and altering the quora of computing nodes by optionally removing one or more the computing nodes to mitigate a likely performance degradation of the cluster of computing nodes.

In one or more embodiments, the assessment of health includes a collection of computer-executable instructions stored along a network file system of the cluster of computing nodes, the computer-executable instructions of the assessment of health, when executed, automatically initializes the assessment of health and causes the execution of the assessment of health by the quora of computing nodes.

In one or more embodiments, initializing the assessment of health includes: assigning the quora of computing nodes to a node testing queue encoded for minimal test of a pair of computing nodes up to testing of the entire quora of computing nodes; and identifying the one or more node health test from a pool of node health tests based on attributes of the computing nodes within the quora of computing nodes.

In one or more embodiments, implementing the bi-directional testing causes each pair of computing nodes of the plurality of distinct pairs of computing nodes to establish a communication channel between computing nodes defining each respective pair of computing nodes, and execute one or more node health tests by transmitting data associated with the execution of the one or more node health test via the communication channel of each respective pair of computing nodes.

In one or more embodiments, the bi-directional testing data includes one or more of data processing rates of each pair of computing nodes and data transmission rates of each pair of computing nodes.

In one or more embodiments, the method further includes ordering the plurality of distinct pairs of computing nodes based on descending performance metrics; applying the one or more benchmark node performance values against the ordering of the plurality of distinct pairs of computing nodes, wherein classifying the at least one computing node of the quora of computing nodes as unhealthy is based on the application of the one or more benchmark node performance values against the ordering of the plurality of distinct pairs of computing nodes.

In one or more embodiments, the method includes verifying the classification of the at least one computing node as unhealthy, wherein the verification includes assessing the at least one computing node against a reference computing node having a classification of healthy.

In one or more embodiments, the health assessment includes a drop out and accumulation health assessment that per iteration of the node health assessment against the quora of computing nodes: drops out a given computing node as identified as unhealthy from the quora of computing nodes by altering the quora of computing nodes to exclude the given computing node, and accumulates computing nodes not identified as unhealthy within the quora of computing nodes by maintaining member computing nodes of the quora of computing nodes to a subsequent iteration of the node health assessment.

In one embodiment, a computer-implemented method for detecting non-performant computing nodes within a cluster of computing nodes, the computer-implemented method includes initializing an assessment of health of a cluster of computing nodes based on one or more assessment instruc- tions, wherein initializing the assessment of health includes: identifying a plurality of computing nodes within the cluster of computing nodes that are in an idle state; assigning at least a subset of computing nodes of the plurality of com- puting nodes in the idle state to a queue for testing a state of health of each of the subset of computing nodes; defining a plurality of pairings of computing nodes based on the subset of computing nodes, wherein each pairing of computing nodes of the plurality of pairings of computing nodes includes a distinct paired combination of computing nodes selected from the subset of computing nodes; executing the assessment of health against the plurality of pairings of computing nodes, wherein the executing the assessment of health includes: implementing a bi-directional testing by each pairing of computing nodes of the plurality of pairing of computing nodes, wherein each pairing of computing nodes executes one or more node health tests based on testing communications between nodes defining each respective pairing of computing nodes of the plurality of pairings of computing nodes; obtaining assessment data based on the execution of the health assessment by the plurality of pairings of computing nodes, wherein the assess- ment data includes efficacy metrics for each pairing of computing nodes of the plurality of pairings of computing nodes, the efficacy metrics relating to a value of a data processing performance or a value of a data transmission performance of each pairing of computing nodes resulting from the execution of the one or more node health tests; identifying as likely unhealthy nodes one or more computing nodes failing to satisfy one or more health efficacy thresh- olds based on the assessment data; and altering a state of the one or more computing nodes identified as likely unhealthy nodes from an online state to an offline state thereby mitigating a likely degradation of the cluster of computing nodes.

In one or more embodiments, the one or more health efficacy thresholds relates to one or more minimum expected efficacy values for the value of the data processing perfor- mance or the value of the data transmission performance.

In one or more embodiments, implementing the bi-direc- tional testing of the plurality of pairings of computing nodes includes establishing a testing channel between the nodes of each respective pairing of computing nodes of the plurality of pairings of computing nodes; and execute one or more node health tests by transmitting data associated with the execution of the one or more node health test via the test channel of each respective pairing of computing nodes of the plurality of pairings of computing nodes.

In one or more embodiments, altering the state of the one or more computing nodes identified as likely unhealthy further includes marking the one or more computing nodes for a fault verification process that identifies a distinct hardware component contributing to the identification of the one or more computing nodes as likely unhealthy.

In one or more embodiments, the method further includes routing the one or more computing nodes to a fault charac- terization process based on the identification of the one or more computing nodes as likely unhealthy; identifying by the fault characterization process one or more hardware components failing to satisfy one or more hardware perfor- mance standards; and characterizing a fault of the one or more computing nodes based on the identified one or more hardware components failing to satisfy the one or more hardware performance standards.

In one or more embodiments, the queue for testing the state of health of each of the subset of computing nodes is encoded two nodes or more testing of the computing nodes in a plurality of testing cycles, and for each testing cycle of the plurality of testing cycles, a group of potentially unhealthy nodes is identified.

In one or more embodiments, the assessment of health further includes identifying the one or more computing nodes that are shared or common to two or more groups of potentially unhealthy nodes, wherein the identification of the one or more computing nodes as likely unhealthy nodes if further based on the one or more computing nodes being shared or common to the two or more groups of potentially unhealthy nodes.

In one or more embodiments, the cluster of computing nodes includes a plurality of diverse computing nodes having varying hardware components, the executing the assessment of health further includes identifying a homo- geneous group of computing nodes of the cluster of com- puting nodes, the homogeneous group of computing nodes relating to computing nodes having a same processing component or a same network interconnect component, and identifying the plurality of computing nodes that are in the idle state are selected from within the homogeneous group of computing nodes of the cluster of computing nodes.

In one or more embodiments, the method includes gen- erating benchmark data based on using the one or more health tests to evaluate a subset of computing nodes of the cluster of computing nodes before executing the node health assessment, wherein the benchmark data includes one or more expected values of performance for a given computing node identified as a healthy node.

In one embodiment, a computer-program product embod- ied in a non-transitory machine-readable storage medium storing computer instructions that, when executed by one or more processors, perform operations including implement- ing an assessment interface in operable command commu- nication with an administrative computing node of a cluster of computing nodes, the administrative computing node being network to computing nodes of the cluster of com- puting nodes for implementing an assessment of health; identifying a quora of computing nodes of the cluster of computing nodes, the quora of computing nodes including a subset of computing nodes within the cluster of computing nodes having hardware components that are homogeneous; signaling, via the assessment interface, the administrative computing node to cause the quora of computing nodes to execute the assessment of health, wherein executing the assessment of health includes: defining, for each test cycle of a plurality of test cycles of the assessment of health, a plurality of distinct pairs of computing nodes from the quora of computing nodes, wherein each test cycle of the assess- ment of health assesses a different combination of paired computing nodes of the plurality of distinct pairs of com- puting nodes; implementing a bi-directional testing by each pair of computing nodes of the plurality of distinct pairs of computing nodes; evaluating bi-directional testing data obtained based on the execution of the assessment of health of the quora of computing nodes; classifying at least one computing node of the quora of computing nodes as unhealthy when the evaluation indicates that a subset of the bi-directional testing data associated with the at least one computing node fails to satisfy one or more benchmark node performance values; and altering the quora of computing nodes by removing designated unhealthy computing nodes to mitigate a likely performance degradation of the cluster of computing nodes.

In one or more embodiments, ordering the plurality of distinct pairs of computing nodes based on descending performance metrics; applying the one or more benchmark node performance values against the ordering of the plurality of distinct pairs of computing nodes, wherein classifying the at least one computing node of the quora of computing nodes as unhealthy is based on the application of the one or more benchmark node performance values against the ordering of the plurality of distinct pairs of computing nodes.

In one or more embodiments, the health assessment includes a drop out and accumulation health assessment that per iteration of the node health assessment against the quora of computing nodes: drops out a given computing node as identified as unhealthy from the quora of computing nodes by altering the quora of computing nodes to exclude the given computing node, and accumulates computing nodes not identified as unhealthy within the quora of computing nodes by maintaining member computing nodes of the quora of computing nodes to a subsequent iteration of the node health assessment.

BRIEF DESCRIPTION OF THE FIGURES

FIG. 2 illustrates an example method in accordance with one or more embodiments of the present application;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Enhanced Cluster Health Management and Unhealthy Node Detection

Figure 1:
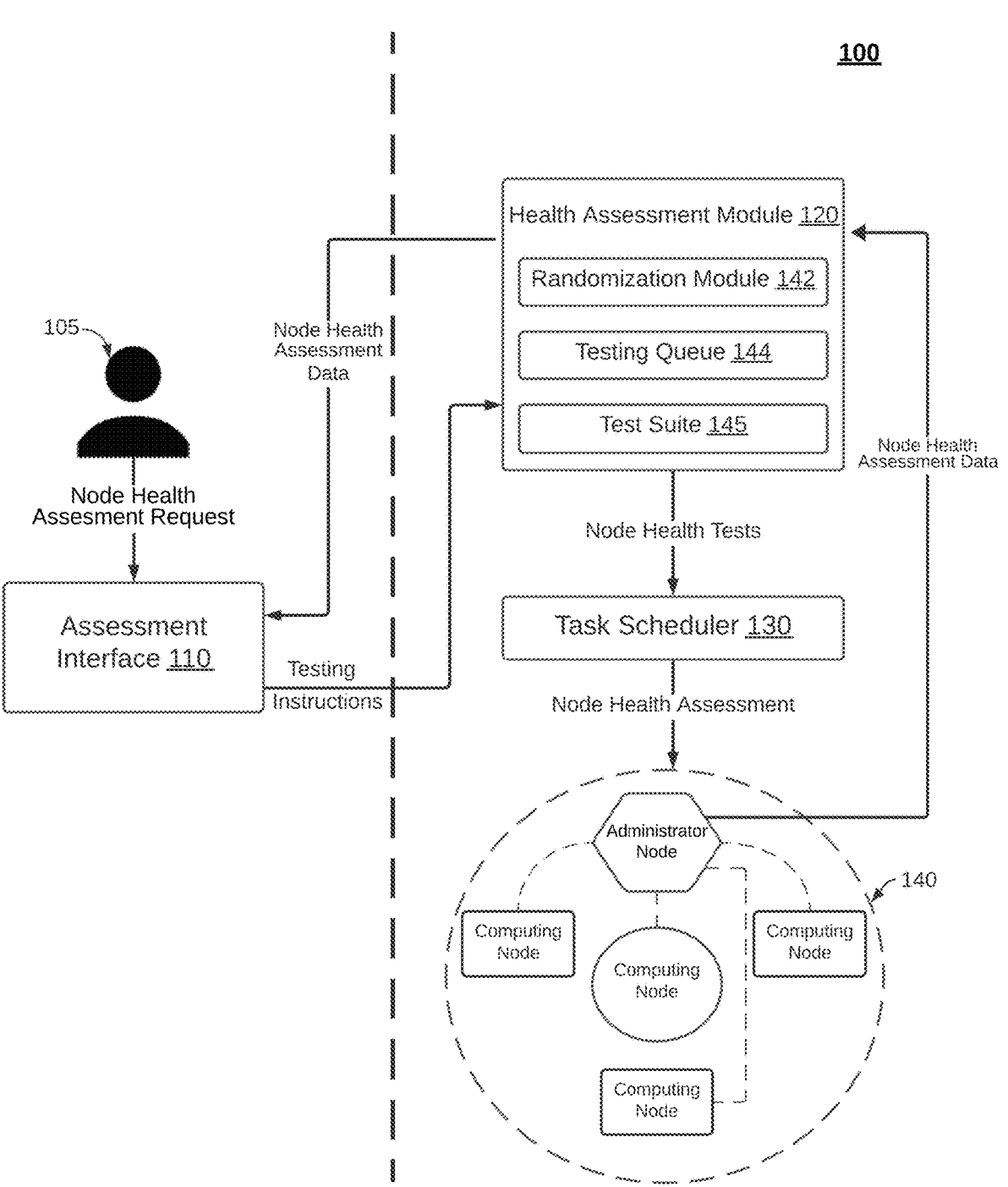
FIG. 1 illustrates a schematic representation of a system in accordance with one or more embodiments of the present application.

As shown in FIG. 1, a system 100 implementing enhanced cluster health management and for detecting unhealthy computing nodes within a cluster of computer nodes includes a node health assessment interface 110, a health assessment module 120, and a task scheduler 130 for assessing the health of a cluster of computing nodes 140.

1.1 Computing Node Health Assessment Interface

The node health assessment interface 110, which may also be referred to herein as assessment interface 110, preferably includes a command interface or system programming interface or console through which an administrator 105 may operate to execute a node health assessment of a target cluster of computing nodes 140. In a preferred embodiment, the assessment interface 110 is preferably implemented by one or more computers and may be in operable control communication with one or more computing nodes of a target cluster of computing systems. In such preferred embodiment, the assessment interface 110 may function to receive, as input, one or more user commands for executing one or more aspects of a node health assessment of a target cluster of computing nodes 140 and output control signals to the one or more computing nodes of the target cluster of computing nodes 140.

In one or more embodiments, the one or more computing nodes of a target cluster of computing nodes 140 that may be operably controlled via the assessment interface 110 preferably include an administrator node. In such embodiments, the administrator node comprises one computing node of the target cluster of computing nodes 140 that may be in network communication with all computing nodes of the target cluster of computing nodes 140. The administrator node executing commands or instructions from the assessment interface 110 may function to administer any suitable tests to the target cluster of computing nodes 140 including, but not limited to, a node health assessment. In some embodiments, the administrator node may be referred to herein as a head node or a control node depending on its operation within the cluster of computing nodes 140. Accordingly, the administrator node 105 may have installed cluster management software or similar applications that preferably enables the administrator node 105 to coordinate activities of the cluster of computing nodes 140, manage resource allocation, perform scheduling (e.g., integrated scheduler 130), and/or support maintaining an overall health of the cluster of computing nodes 140.

Additionally, or alternatively, the administrative node may be in operable control communication of a parallel file system or the like for administering any suitable tests, including a node health assessment, to a target cluster of computing nodes 140. Additionally, or alternatively, the administrative node may include an assessment agent installed thereon that may be in communication and operably controlled via commands from the assessment interface 110. In some embodiments, the assessment agent of the administrator node based on command inputs from the assessment interface 110 may function to automatically execute one or more operations or functions of a node health assessment against a target cluster of computing nodes 140.

1.2 Health Assessment Module

The health assessment module 120, in one or more embodiments, which is in operable communication with one or more of the assessment interface 110, the node assessment scheduler 130, and cluster of computing nodes 140 may operate to configure one or more node health assessments and/or execute one or more node health assessments against a target set of computing nodes of the cluster of computing nodes 140. In one or more embodiments, the health assessment module 120 may function to store and/or have access to a test suite 145, which is sometimes referred to herein as a pool of node health tests, that includes a plurality of node health tests. At runtime, the health assessment module 120 may function to source from the test suite 145 one or more node health tests, which may be executed either serially or in parallel against computing nodes of the cluster of computing nodes 140.

In one or more embodiments, the health assessment module 120 may be implemented in cooperation with a network file system, a parallel file system or the like. In such embodiments, the health assessment module 120 may be implemented by an administrative computing node of a target cluster of computing nodes, the administrative computing node may be sometimes referred to herein as a "head node" or "node zero". Additionally, or alternatively, each computing node in the target cluster of computing nodes may store a copy of the tests and/or assessments associated with an operation of the health assessment module 120. In this way, commands and/or signals from the health assessment module 120 may cause any or each of the computing nodes of the target cluster to access one or more tests and/or assessments and execute the tests or assessments concurrently. In such embodiments, the outputs of the execution of the tests and/or assessments by the target cluster of computing nodes may be stored to or served out to the network file system.

Additionally, or alternatively, the health assessment module 120 may function to implement and/or include one or more of a randomization module 142 and a testing queue 144 that may operate together for initializing and executing a node health assessment of computing nodes of a cluster of computing nodes 140. In one or more embodiments, the randomization module 142 may function to ensure that different first computing nodes are seeded to prevent biased results on the basis of an initial computing node selection from a batch of computing nodes subject to a node health assessment.

1.3 Automated Task Scheduler

The task scheduler 130 preferably functions as an orchestration layer that automatically facilitates a node health assessment. In a preferred embodiment, the task scheduler 130 may function to integrate node health assessments directly into an operational workflow of the cluster of computing nodes 140. Accordingly, the task scheduler 130 may be multi-faceted in its automated application of node health assessments on a predetermined schedule or dynamically during a pre-job deployment of a batch of computing nodes.

In one or more embodiments, the task scheduler 130 may function to continually and/or periodically monitor a state of computing nodes within the cluster of computing nodes 140 to identify idle computing nodes that are not currently allocated to user jobs. In such embodiments, the task scheduler 130 may batch the idle computing nodes to the node testing queue 144 for a node health assessment.

1.4 Cluster of Computing Nodes

The cluster of computing nodes 140 preferably includes a plurality of distinct computing nodes where each distinct node comprises a computer. In a preferred embodiment, the computer typically includes a server-grade machine, equipped with one or more of central processing units (CPUs), graphical processing units (GPUs), both, or similar processing components capable of executing tasks and running applications. In one or more embodiments, the plurality of distinct computing nodes in a cluster may include network interconnects comprising high-speed communication pathways that link the computing nodes together, facilitating rapid data transfer. One or more examples of network interconnects may include, but should not be limited to, InfiniBand, Ethernet, fiber-optic connections that may enable the computing nodes to operate in concert for distributed computing tasks.

Additionally, or alternatively, a cluster of computing nodes may include a storage system having an associated memory or data storage solutions that may range from local disk drives within each computing node of the cluster of computing nodes 140 to shared storage systems, such as storage area network (SAN) or network attached storage (NAS), accessible by all computing nodes in cluster 140 for distributed file systems and data persistence. In a preferred embodiment, the cluster of computing nodes 140 preferably employs a parallel file system that allows multiple computing nodes to access and process data simultaneously, which may increase throughput and efficiencies of the computing nodes.

2. Method for Enhanced Cluster Health Management and Unhealthy Node Detection As shown in FIG. 2, a method 200 implementing enhanced cluster health management and for detecting unhealthy computing nodes within a cluster of computer nodes includes configuring a health assessment for a set of computing nodes S210, executing a health assessment for the set of computing nodes S220, identifying health assessment observations of the set of computing nodes S230, and mitigating unhealthy nodes from a cluster of computing nodes S240, and handling non-performant or unhealthy computing nodes S250.

The method 200 as implemented by one or more systems (e.g., system 100) preferably provides a scalable solution for monitoring and maintaining the health of computing clusters by detecting un-reported technical issues. In particular, the method 200 in various embodiments functions to systematically identify underperforming computing nodes and/or components and thereby aids in a prevention of performance degradation and further extends a reliable operation of the hardware of a cluster of computing nodes.

2.10 Node Health Assessment Configuration

S210, which includes configuring or setting one or more node health assessment parameters, may function to define via assessment interface 110 or the like parameters for testing the operational health of a set of computing nodes within a cluster of computing nodes. In one or more embodiments, the one or more node health assessment parameters may function to define one or more conditions and/or one or more bounds that govern an operation and/or execution of a given node health assessment of a cluster of computing nodes.

In one or more embodiments, configuring or setting the one or more node health assessment parameters may include defining or setting criteria of a basis block unit. A basis block unit, as referred to herein, preferably relates to a minimum chunk of an allocatable computing resource for testing collectives. In the case of performing health assessment tests for a cluster of computing nodes, a basis block unit may be defined by three or more available computing nodes within a cluster of computing nodes. Additionally, or alternatively, in the case of performing health assessment tests of computing components, a basis block may similarly be a minimum of three or more allocatable computing components (e.g., graphic processing units, networking cards, etc.) that are accessible and available for collective testing.

Additionally, or alternatively, in some embodiments, a basis block unit may be a fundamental computing unit or node that is sufficiently healthy for performing fundamental and/or desired computing and/or interconnect tasks. It shall be recognized that a basis block unit may be defined in any suitable manner that considers operational fault tolerances and/or minimum performance requirements such that a basis block unit may include an amount of non-performant components but may still satisfy criteria for a given basis block unit.

Accordingly, in operation, a system (e.g., system 100 or a service) implementing method 200 may function to receive, as input, a specification data for defining a basis block unit. In such embodiments, once the specification data is received, the method 200 and/or the system executing the method 200 encodes or sets a basis block unit as an initialization parameter of a given node health assessment.

In one or more embodiments, configuring or setting the one or more node health assessment parameters may include defining or setting an extent of a node health assessment. In such embodiment, S210 may function to define or set a value of an upper limit parameter that sets a largest size of a node health assessment. That is, the upper limit parameter may define a maximum number of computing nodes that may be assessed or tested during a given session of a node health assessment. In operation, an arbitrary number of nodes may be testable or assessed via a node health assessment, however, a delimitation of an upper limit or maximum number of testable nodes may ensure an availability of computing nodes for executing jobs and/or various computing tasks. As a non-limiting example, a maximum number of computing nodes that may be tested at a given time or during a given node health assessment may be limited to ten (10) or twenty (20) basis block units. In such non-limiting example, if the upper limit of testable basis block units is 20, the given node health assessment may function to cap a node testing such that a quora of testable nodes of a cluster of computing nodes may include less than the upper limit parameter but not exceed the upper limit parameter.

Additionally, or alternatively, configuring or setting the one or more node health assessment parameters may include selecting a suite of tests or assessments to apply in the node health assessment of target computing nodes in a cluster of computing nodes. In one or more embodiments, S210 may enable a selection of a suite of tests from a pool of pre-existing tests and/or test scripts. In such embodiments, the selection of one or more tests from the pool of tests that define the suite of tests may be based on attributes (e.g., node model, hardware type, hardware components, and the like) of the target computing nodes subject to the node health assessment. In a variation of this embodiment, S210 may enable a custom creation of test scripts or node health tests, which may be added in the suite of tests for execution in the node health assessment.

Additionally, or alternatively, S210 may function to configure an application of the suite of tests during the node health assessment. In one or more embodiments, based on test application parameters, S210 may function to execute node health assessments across a plurality of computing nodes in parallel and/or in tandem. That is, in a parallel application of a node health assessment, a same suite of tests may be applied to a set of computing nodes at the same time or substantially the same time thereby allowing for a scaled and accelerated evaluation of multiple computing nodes. As such, at least one technical advantage of such embodiments includes improved efficiency in an evaluation of many computing nodes allowing for a detection of an unhealthy node faster than existing testing mechanisms.

2.20 Node Health Assessment: Configuration Phase

S220, which includes executing a node health assessment of a set of (or target) computing nodes of a given cluster of computing nodes. In a preferred embodiment, the execution of the node health assessment of the set of computing nodes may be based on or informed by the one or more node health assessment parameters, as described in S210. Additionally, or alternatively, executing a node health assessment may be considered as a multi-part implementation in which an initialization and/or a configuration of one or more modules or testing components of a node health assessment may be performed in a first phase and an execution of the tests of the node health assessment may be performed in a second phase. It shall be recognized that while, in some embodiments, a node health assessment may be implemented in multiple parts or multiple phases, in other embodiments, the node health assessment may be contiguously implemented in a single phase.

Accordingly, a node health assessment for a set of computing nodes may be based on a combination of predefined and dynamic criteria. In one or more embodiments, the predefined criteria may include manufacturer specifications and past performance logs, while dynamic criteria could involve real-time workload demands and network activity. Thus, the assessment configuration phase, as described herein, preferably allows for the tailoring of node health assessments to the specific architecture and use cases of the cluster of computing nodes thereby enhancing the precision of the detection process of unhealthy or non-performant computing nodes.

Assessment Configuration Phase: Idle Computing Nodes

In one or more embodiments, executing the node health assessment may include an initial phase that may include identifying a set of testable computing nodes of a target cluster of computing nodes. A target cluster of computing nodes may, in some embodiments, include a combination of active computing nodes and idle computing nodes. In a preferred embodiment, S220 may function to identify, as testable computing nodes, the idle computing nodes of the target cluster of computing nodes and, optionally, select at least a subset of the idle computing nodes for testing via the node health assessment. In this preferred embodiment, S220 may function to select idle computing nodes which preferably relate to computing nodes without impending computing jobs, user jobs, and/or interconnect tasks. In this way, a testing of a currently idle set of computing nodes may not interfere with one or more computing jobs and/or interconnect tasks intended for the idle computing nodes at a future time or interfere with active jobs being executed by active computing nodes of the target cluster of computing nodes.

Figure 3:
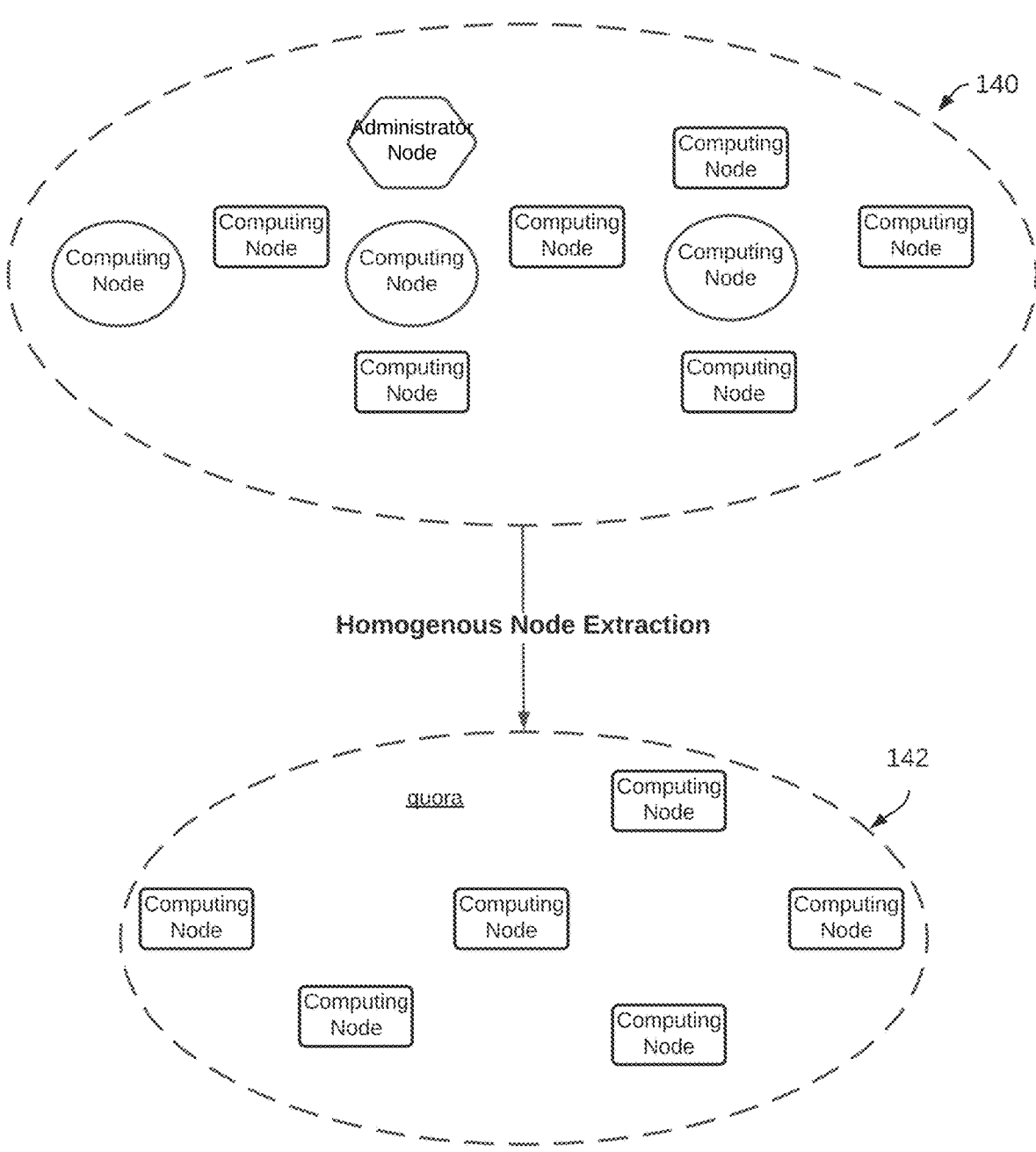
FIG. 3 illustrates an example of homogeneous node identification in accordance with one or more embodiments of the present application.

In a preferred embodiment, S220 may function to select from the set of idle computing nodes only the idle computing nodes that may be homogeneous (e.g., same model server or same components) rather than heterogeneous, as shown by way of example in FIG. 3. Because the set of idle computing nodes may include computing nodes having heterogeneous structures and/or compositions (e.g., varying interconnect/networking bands, varying processing units, etc.), S220 preferably selects for inclusion in a batch for a node health assessment only idle computing nodes that may be homogeneous in type, structures and/or compositions. In such embodiments, the homogeneity of the idle computing nodes being evaluated in a given node health assessment ensures valid collective testing, which may include point-to-point, peer-to-peer testing and/or similar testings. That is, in a given node health assessment that includes a pool or suite of tests or testing scripts, heterogeneous computing nodes may theoretically execute the suite of tests differently in peer-to-peer testing thereby causing an inability to compute valid results in the peer-to-peer comparisons. Conversely, homogeneous computing nodes executing a same pool of tests should behave similarly, assuming the computing nodes are not errant or otherwise non-performant for one or more reasons relating to the operability of their hardware and/or software components.

It shall be recognized that while in preferred embodiments, homogeneous computing nodes may be grouped into a batch for a node health assessment, in other embodiments, heterogeneous computing nodes may also be grouped for a node health assessment. In such other embodiments, a group of heterogeneous computing nodes may include one or more components that may be homogeneous among the heterogeneous computing nodes in the group. Accordingly, in such variation, S220 may enable a node health assessment on the basis of evaluating homogeneous components (e.g., same model GPUs) within a group of heterogeneous computing nodes.

Assessment Configuration Phase: Node Testing Queue

Additionally, or alternatively, once a set of idle computing nodes may be identified as likely candidates for a node health assessment, S220 may function to reserve the set of idle computing nodes for collective testing by grouping at least a subset of the idle computing nodes into a node testing queue 144 or the like. In one or more embodiments, once the group or set of idle computing nodes are moved into a reserved state in which the idle computing nodes are set aside for testing, the group of idle computing nodes may be referred to as a group of reserved computing nodes since during a testing phase the computing nodes become active and are no longer idle during an execution of one or more tests by computing nodes within the group of reserved computing nodes. Conversely, upon completion of a node health assessment of the group of reserved computing nodes, the method 200 may function to revert or alter the state of the group of reserved computing nodes to idle computing nodes by moving the computing nodes from the node testing queue 144 to a queue for idle computing nodes. The node testing queue 144, as referred to herein, preferably refers to a dedicated virtual space and/or memory in which idle computing nodes that have been selected and/or marked for testing may be itemized or enumerated by one or more unique identifiers of the selected idle computing nodes and made available for various testings via the node health assessment. Accordingly, in or more embodiments, the node testing queue 144 may function as a mechanism for orchestrating a given node health assessment of a target set of computing nodes within a cluster of computing nodes 140.

In a preferred embodiment, S220 may function to ensure that a sufficient number of idle computing nodes are added to the node testing queue 144 satisfying a lower bound parameter and/or lower limit parameter/threshold identifying a minimum number of computing nodes that should be tested in a given node health assessment. In such preferred embodiment, the node testing queue 144 is populated with a set of idle computing nodes selected from a target cluster of computing nodes 140, preferably employing a randomization algorithm preventing bias in a selection process of the population of idle computing nodes. The randomization algorithm preferably ensures varied starting or seeding nodes for each test sequence thereby mitigating the risk of consistent underperformance from any single computing node that may skew the results of a node health assessment. For instance, in some embodiments, a node health assessment test may be benchmarked against an initial peer-to-peer testing between two computing nodes, which may be seeded with a non-performant computing node. In such embodiments, the resulting performance data if propagated as a benchmark for downstream testing of other computing nodes may unfavorably skew testing results such that other non-performant computing nodes may not be detected due to using a benchmark having degraded performance results.

Additionally, or alternatively, S220 may function to ensure that a number of computing nodes added to the node testing queue 144 does not exceed an upper limit parameter identifying a maximum number of computing nodes that should be tested in a given node health assessment. In this way, an availability of computing nodes with a target cluster of computing nodes 140 may be preserved for potential computing jobs and/or networking tasks.

Assessment Configuration Phase: N−1 Drop Out Testing

Figure 4:
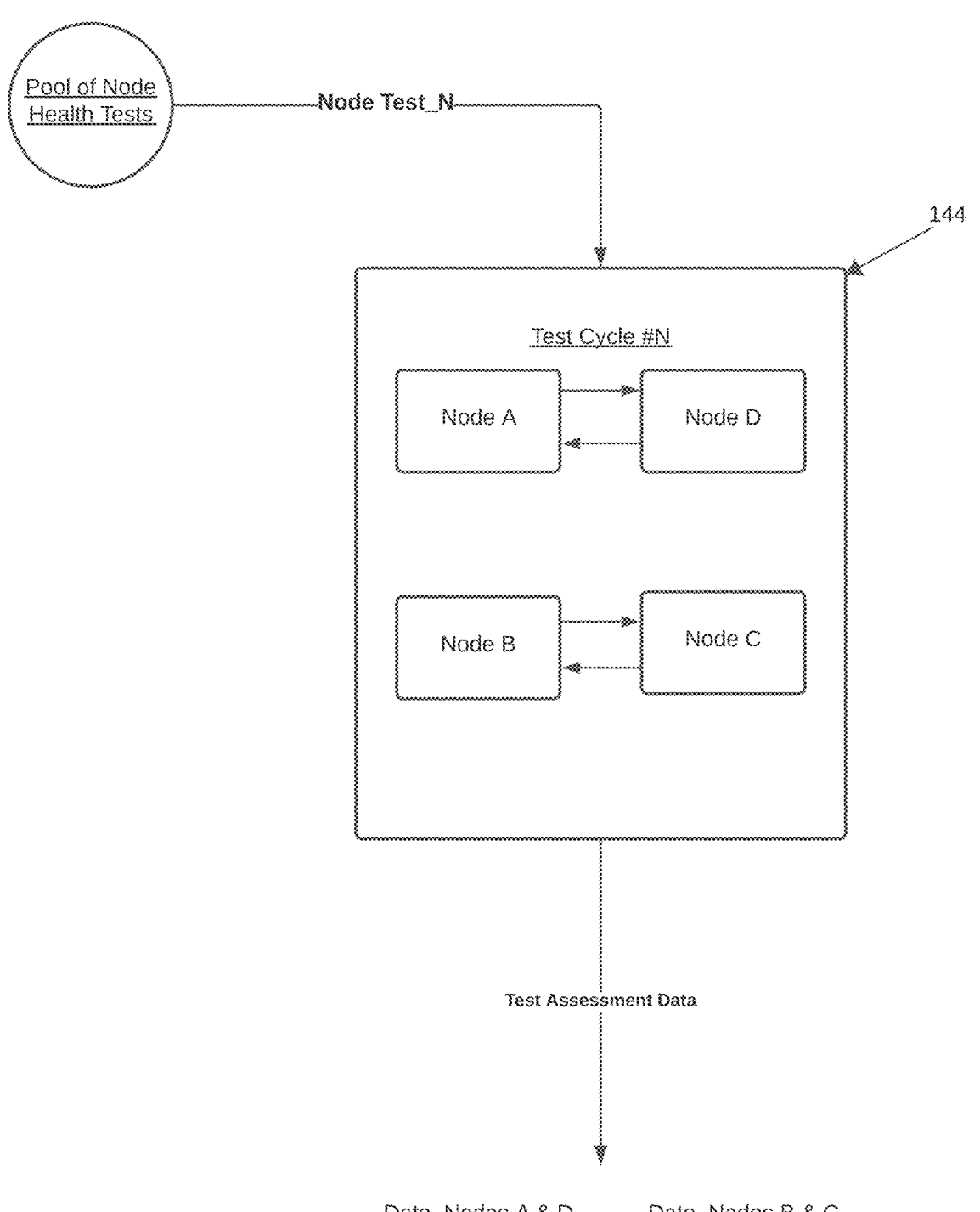
FIG. 4 illustrates an example implementing a testing cycle of a node health test subject to n–1 testing in accordance with one or more embodiments of the present application.

Additionally, or alternatively, S220 may function to configure the node testing queue 144 according to n−1 testing. In one or more embodiments, S220 may function to subject the node testing queue 144 to n−1 testing which governs a bi-directional assessment between pairs of idle computing nodes assigned to the node testing queue 144, as shown by way of example in FIG. 4. In such embodiments, "n" preferably represents the number of idle computing nodes or computing node components that may be grouped or batched into the node testing queue 144 and accordingly, when the node testing queue 144 is subjected to n−1 testing preferably causes the node testing queue 144 and/or a node health assessment module to generate a plurality of distinct testing combinations that include possible paired combinations of the idle computing nodes within the node testing queue 144 while excluding at least one idle computing node or a paired combination of idle computing nodes within the node testing queue 144. Accordingly, in one or more embodiments, the term "n" may represent a total number of nodes in a batch or group of idle computing nodes being considered for a node health assessment test assigned to a node testing queue 144. Stated differently, during n−1 testing, a given idle computing node or a given paired combination of idle computing nodes may be systematically excluded in each test iteration to determine an impact of the given idle computing node or the given paired combination of computing nodes on an overall performance of batch of idle computing nodes within the node testing queue 144.

Figure 5:
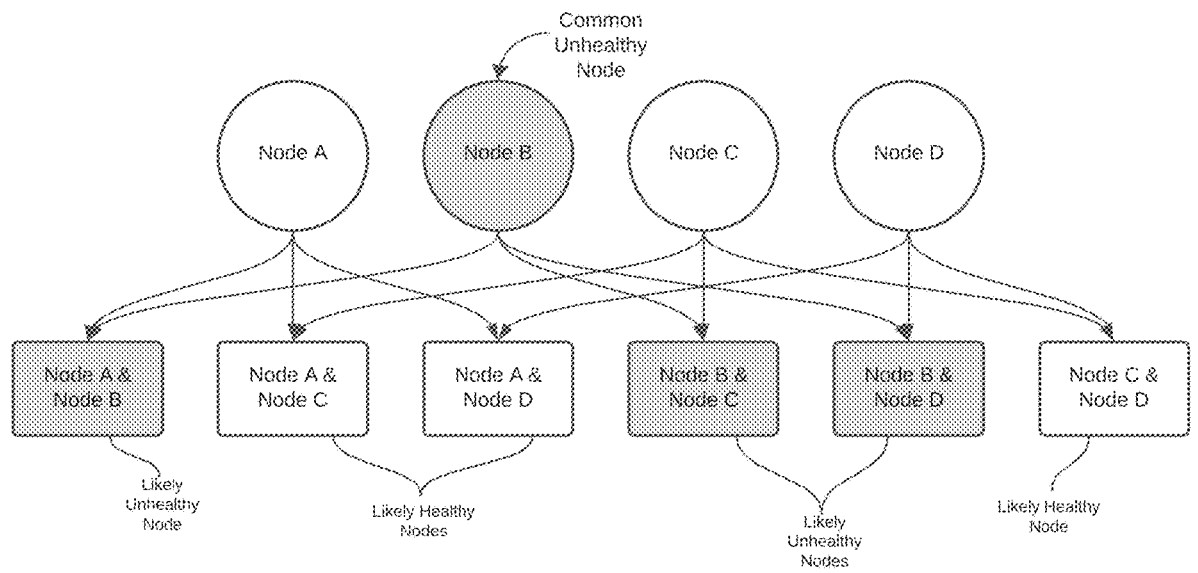
FIG. 5 illustrates an example of a delineation of likely healthy and likely unhealthy node pairings in accordance with one or more embodiments of the present application.

As a non-limiting example, a group of "n" idle computing nodes may be identified or selected for testing. In this example, the group of idle computing nodes may include Node A, Node B, Node C, and Node D selected from a cluster of computing nodes 140 and populated as a batch assigned to a node testing queue 144 that may be subject to n−1 testing. As shown by way of example in FIG. 5, a total of six (6) distinct paired combination of idle computing nodes may be delineated (i.e., Nodes A & B, Nodes A & C, Nodes A & D, Nodes B & C, Nodes B & D, and Nodes C & D) for the node health assessment. Accordingly, in this example, because there are 6 paired combinations of idle computing nodes, a total of 6 testing cycles may be executed, which may exclude or drop out a different paired combination of idle computing nodes in each cycle.

Accordingly, in one or more embodiments, the n−1 testing configuration of the node testing queue 144 enables a system or service executing the node health assessment to systematically identify faulty or likely faulty computing nodes within a batch by systematically excluding a given computing node or pair of computing nodes during an instance of testing and thereby exclude or drop out (from subsequent testing cycles) each faulty node at a time while allowing the computing nodes remaining the batch to potentially accumulate as performant or good basis block units. Additionally, or alternatively, S220 may function to configure batch sizes of the computing nodes to mitigate seeding a node health assessment with values from a faulty computing node or the like. By setting the batch sizes of (idle) computing nodes to relatively small numbers, benchmarking with testing values from a faulty computing node may only affect an assessment of only a limited number of other computing nodes within the small batch.

2.30 Node Health Assessment: Assessment Execution Phase

S230, which includes executing a node health assessment, may function to execute collective testing, which may include point-to-point, peer-to-peer testing and/or similar testings of a quora of computing nodes enabling a detection of non-performant computing nodes (e.g., drop out) from the quora and a maintenance of performant computing nodes (e.g., accumulation) within the quora. Accordingly, based on the configuration of a node health assessment in one or more embodiments, the node health assessments may be executed by sending diagnostic commands from an administrator node 105 or the like to each computing node of the quora. In such embodiments, command signals may prompt the quora of computing nodes to perform bi-directional tests and self-tests and report back to the administrator node 105. The execution phase of a node health assessment may be optimized by the node health assessment parameters to minimize performance disruptions, often scheduling the most resource-intensive tests during off-peak hours (e.g., times with the most idle computing nodes).

Scaled Node Health Assessment

In a first implementation, S230 may function to execute a scaled execution of a given node health assessment. In this first implementation, if a number of idle computing nodes that may be a target of a given node health assessment satisfies or exceeds a scaled assessment threshold, S230 may function to execute the given node health assessment of one or more batches of the idle computing nodes by subjecting the node testing queue 144 to n–1 testing. The scaled assessment threshold preferably relates to a maximum number of computing nodes that may typically be tested using a different testing technique for lower volume of test subjects, such as pairwise testing.

In one or more embodiments of this first implementation, S230 may function to execute bi-directional testing of paired combinations of idle computing nodes within a node testing queue 144. The bi-directional testing, as referred to herein, preferably includes a testing mechanism that measures the performance between pairs of computing nodes by causing a given pair of computing nodes to execute one or more tests of a node health assessment via data transmissions to each other and/or processing operations between each other. In such embodiments, by testing in both directions of a paired combination of idle computing nodes, bi-directional testing simulates a likely real-world usage with higher accuracy than unidirectional testing thereby providing an improved assessment of how the paired combination of idle computing nodes may perform under normal or real-world operating circumstances.

Accordingly, in circumstances in which the health of network interconnects may be important for the performance of processing components (e.g., GPUs, CPUs, etc.) of a target cluster of computing nodes 140, bi-directional testing may ensure that fiber-optic networks and associated networking components (e.g., network cards) used to connect processing components (e.g., GPU servers) are capable of operating peak performance of high-speed, two-way data transmission.

In one or more embodiments, each paired combination of idle computing nodes may be bi-directionally tested for performance according to one or more standardized and/or node health tests that may be selected from a pool of node health tests. In one or more embodiments in which the node health assessment includes a plurality of distinct node health tests, S230 may function to execute one or more of the plurality of distinct node health tests serially and/or in a parallel manner. In the one or more embodiments in which the pool of node health tests may be executed serially, S220 may function to derive or define a testing sequence in which the plurality of node health tests may be arranged in an order in which the node health tests will be executed, such that when a given node health test within the testing sequence is completed, a node health test following the given node health test may be automatically executed against the batch of idle computing nodes.

Conversely, or additionally, in one or more embodiments, the pool of node health tests of a node health assessment may be executed in parallel such that a given paired combination of idle computing nodes may be subject to multiple node health tests at the same time; that is, two or more node health tests may be applied to a paired combination of idle computing nodes at the same time. In such embodiments, the two or more node health tests applied against a paired combination of idle computing nodes may be applied against different components of the paired combination of idle computing nodes. As a non-limiting example, a first node health test of a set of node health tests being applied in a parallel manner against a paired combination of idle computing nodes may function to test a networking component (e.g., networking cards) while a second node health test operates to test a processing component (e.g., GPUs) of the paired combination of idle computing nodes.

Pairwise Accumulation and Drop Out

In a second implementation, idle computing nodes added to a node testing queue 144 may be subject to pairwise testing via a node health assessment. In one or more embodiments, if a number or scale of computing nodes that may be targets for a node health assessment does not satisfy a node testing threshold (i.e., a minimum of three computing nodes, minimum of three homogeneous node components, and the like), S220 may function to enable simple pairwise testing of the target idle computing nodes within a batch. In such embodiments, S220 may function to bi-directionally test distinct pairs of idle computing nodes on a pair-by-pair basis (e.g., one pair at a time) to identify non-performant computing nodes.

2.40 Health Assessment Data & Metrics|Unhealthy Node Detection

S240, which includes detecting an unhealthy computing node, may function to collect or source node performance metrics and/or observations from an execution of a given node health assessment and preferably, deduce non-performant (e.g., unhealthy) and/or performant (e.g., healthy) computing nodes based on analysis of the node performance metrics and/or observations.

In one or more embodiments, the observations data and/or node performance metrics resulting or derived from an execution of one or more node health assessments may be categorized into various levels of severity or into a hierarchy of severity. In such embodiments, a real-time or near real-time analysis of the observations data trigger immediate responses for bypassing one or more intermediate node health assessment actions or processes (e.g., node health verification or the like) and accelerating mitigation actions that may ameliorate any degradative effects of an unhealthy node. Accordingly, the system executing the method 200 may be configured to differentiate between transient issues and persistent problems within a cluster of computing nodes 140 that could signify an unhealthy computing node.

In one or more embodiments, S240 may function to obtain or derive one or more node testing data metrics relating to, but not limited to, throughput metrics, bandwidth metrics, latency metrics, error rates in a transmission of data, and/or any derivable metric measuring an efficacy or other performance attributes of a target set of computing nodes. Accordingly, as computing nodes of a target batch of computing nodes are being tested, S240 may function to collect summary statistics and/or metrics for each paired combination of idle computing nodes thereby enabling the method 200 to determine which computing nodes should be made available for user jobs and which should be subjected to further testing and/or maintenance and repair.

Figure 6:
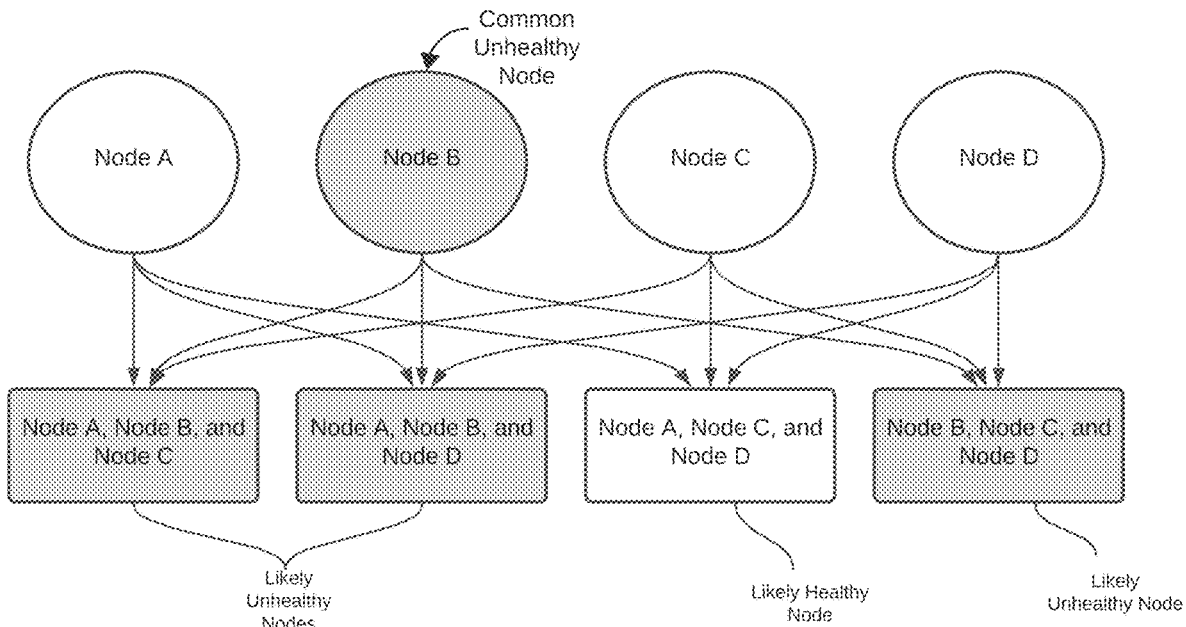
FIG. 6 illustrates an example of deducing a likely unhealthy node based on a common denomination of a node in accordance with one or more embodiments of the present application.

In a first implementation, S240 may function to identify or detect non-performant computing nodes based on deducing a likely faulty computing node based on performance metrics collected during each of a plurality of cycles of an n–1 testing of a batch of idle computing nodes. In this first implementation, S240 may function to identify non-performant paired combinations of idle computing nodes from each cycle of the n–1 testing of the batch. A non-performant paired combination of idle computing nodes preferably relates to a pairing whose metrics that does not satisfy a performance benchmark (e.g., minimum operating or normal operating metrics, or the like). S240 evaluating each testing cycle, may function to extract or identify groups of non-performant paired combinations of idle computing nodes in which one of the idle computing nodes is common to each non-performant paired combination of idle computing nodes. In such embodiments, S240 may generate an inference identifying the idle computing node that is common among the non-performant paired combination of idle computing node is likely a faulty or errant computing node, as shown by way of example in FIG. 6.

Figure 7:
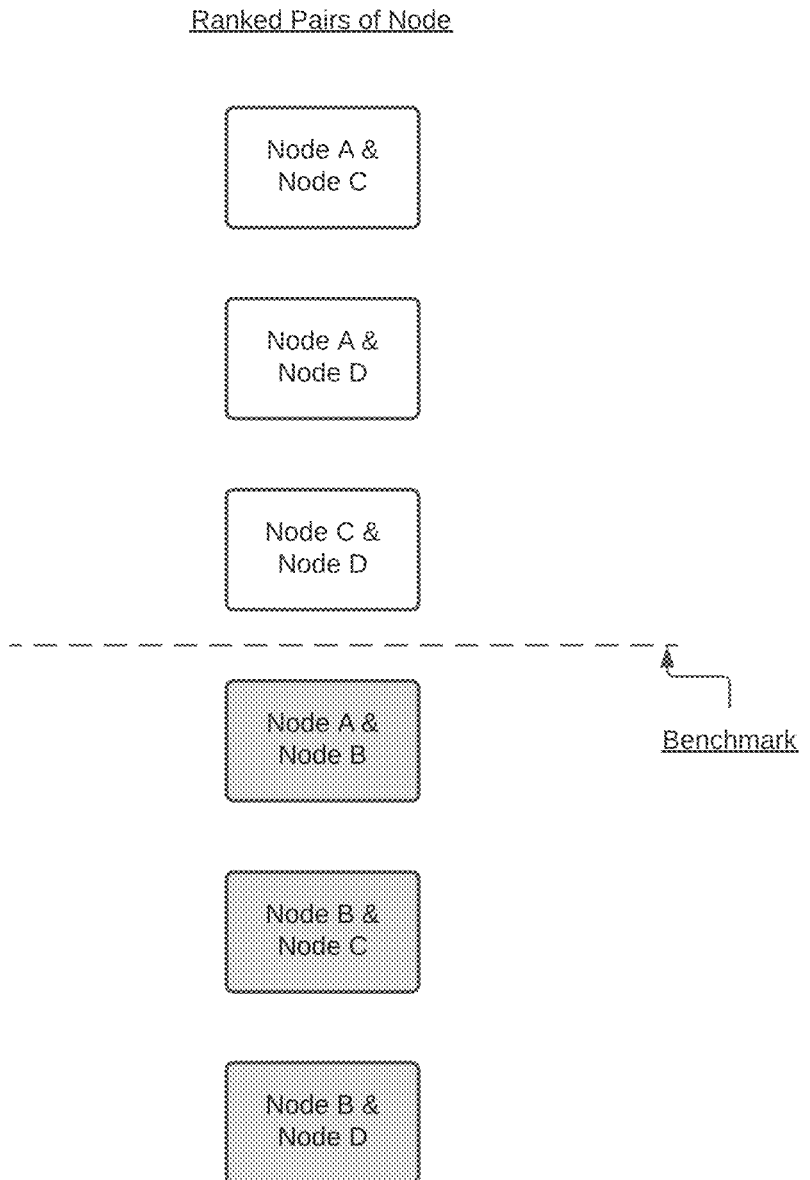
FIG. 7 illustrates an example of identifying likely unhealthy nodes or likely healthy nodes based on ranking node pairings and applying a benchmark in accordance with one or more embodiments of the present application.

In a second implementation, S240 may function to identify or detect non-performant computing nodes based on ranking or ordering each paired combination of idle computing nodes based on test metric data (e.g., descending performance metrics). In this second implementation, S240 may function to generate a plurality of distinct rankings with each distinct ranking being based on a different metric. In one example, in each testing cycle of an n–1 testing, S240 may function to source an average data, a maximum, or a percentile data throughput value for each paired combination of idle computing nodes. In this example, S240 may function to rank the plurality of paired combinations of idle computing nodes based on its associated average data throughput value. As shown by way of example in FIG. 7, in one or more embodiments, S240 applying a performance benchmark, such as a data throughput benchmark, against a ranking of a plurality of paired combinations of idle computing nodes may function to identify the paired combinations satisfying or exceeding the performance benchmark as including performant computing nodes and the paired combinations not satisfying the performance benchmark as likely including one or more non-performant computing nodes.

Additionally, or alternatively, in some embodiments, S240 may function to generate one or more graphical illustrations based on the node performance metrics and/or observations in which likely non-performant paired combinations of idle computing nodes are delineated differently than performant paired combinations of idle computing nodes. Based on the one or more graphical illustrations, likely non-performant paired combinations of idle computing nodes may be selected and/or routed for determining the likely faulty computing node in each non-performant paired combination.

In one or more embodiments, data visualization tools may be integrated within the assessment interface 110, providing administrators with intuitive dashboards that display the health of the cluster of computing nodes 140 and/or any individual computing node within the cluster. In such embodiments, some examples of the graphical illustrations or visualizations may include heat maps delineating between unhealthy and healthy computing nodes using color differentiation, time-series graphs, and computing node interconnectivity diagrams thereby allowing for a quick identification of problematic computing nodes.

2.50 Accumulation and Drop Out|Unhealthy Node Triage

S250, which includes handling non-performant or unhealthy computing nodes, may function to accumulate performant nodes within a quora of computing nodes while excluding or removing non-performant computing nodes based on an assessment of the node health assessment data, as described in at least S240.

In one or more embodiments, if S240 identifies a computing node as likely being a faulty or non-performant computing node, S250 may function to implement one or more protocols that minimize a degradative impact of the non-performant computing node. In such embodiments, S250 may function to quarantine the non-performant computing node from the remaining computing nodes of a target cluster of computing nodes 140. The quarantining, in one or more embodiments, may include flagging or marking the non-performant node for maintenance and further changing a state of the non-performant computing node to be offline from a previous online state. In an offline state, the non-performant computing node may not be accessible for user jobs but may remain accessible for testing, maintenance, and/or repair. Additionally, or alternatively, S250 may function to re-route traffic away from a likely unhealthy computing node that may enable a continued assessment of the likely unhealthy computing node in an online state.

Additionally, or optionally, S250 which includes S255, may function to route any non-performant computing node for additional downstream testing including, but not limited to, testing for characterizing a likely fault of a given non-performant node.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for enhanced cluster health management and detection of unhealthy computing nodes, the method comprising:

implementing an assessment interface in operable command communication with an administrative computing node of a cluster of computing nodes, the administrative computing node being network to computing nodes of the cluster of computing nodes for implementing an assessment of health;

identifying a quora of computing nodes of the cluster of computing nodes, the quora of computing nodes including a subset of computing nodes within the cluster of computing nodes having hardware components that are homogeneous;

signaling, via the assessment interface, the administrative computing node to cause the quora of computing nodes to execute the assessment of health, wherein executing the assessment of health includes:

defining, for each test cycle of a plurality of test cycles of the assessment of health, a plurality of distinct pairs of computing nodes from the quora of computing nodes, wherein each test cycle of the assessment of health assesses a different combination of paired computing nodes of the plurality of distinct pairs of computing nodes;

implementing a bi-directional testing by each pair of computing nodes of the plurality of distinct pairs of computing nodes;

evaluating bi-directional testing data obtained based on the execution of the assessment of health of the quora of computing nodes;

classifying at least one computing node of the quora of computing nodes as unhealthy when the evaluation indicates that a subset of the bi-directional testing data associated with the at least one computing node fails to satisfy one or more benchmark node performance values; and altering the quora of computing nodes by removing the at least one computing node to mitigate a likely performance degradation of the cluster of computing nodes.

2. The method according to claim 1, wherein the assessment of health comprises a collection of computer-executable instructions stored along a network file system of the cluster of computing nodes, the computer-executable instructions of the assessment of health, when executed, automatically initializes the assessment of health and causes the execution of the assessment of health by the quora of computing nodes.

3. The method according to claim 2, wherein initializing the assessment of health includes:

assigning the quora of computing nodes to a node testing queue encoded for minimal pair testing of the quora of computing nodes; and identifying one or more node health tests from a pool of node health tests based on attributes of the computing nodes within the quora of computing nodes.

4. The method according to claim 1, wherein implementing the bi-directional testing causes each pair of computing nodes of the plurality of distinct pairs of computing nodes to establish a communication channel between computing nodes defining each respective pair of computing nodes, and execute one or more node health tests by transmitting data associated with the execution of one or more node health tests via the communication channel of each respective pair of computing nodes.

5. The method according to claim 1, wherein the bi-directional testing data includes one or more of data processing rates of each pair of computing nodes and data transmission rates of each pair of computing nodes.

6. The method according to claim 1, further comprising:

ordering the plurality of distinct pairs of computing nodes based on descending performance metrics;

applying the one or more benchmark node performance values against the ordering of the plurality of distinct pairs of computing nodes, wherein classifying the at least one computing node of the quora of computing nodes as unhealthy is based on the application of the one or more benchmark node performance values against the ordering of the plurality of distinct pairs of computing nodes.

7. The method according to claim 1, further comprising:

verifying the classification of the at least one computing node as unhealthy, wherein the verification includes assessing the at least one computing node against a reference computing node having a classification of healthy.

8. The method according to claim 1, wherein the assessment of health comprises a drop out and accumulation health assessment that per iteration of the assessment of health against the quora of computing nodes:

drops out a given computing node as identified as unhealthy from the quora of computing nodes by altering the quora of computing nodes to exclude the given computing node, and accumulates computing nodes not identified as unhealthy within the quora of computing nodes by maintaining member computing nodes of the quora of computing nodes to a subsequent iteration of the assessment of health.

9. A computer-implemented method for detecting non-performant computing nodes within a cluster of computing nodes, the computer-implemented method comprising:

initializing an assessment of health of a cluster of computing nodes based on one or more assessment instructions, wherein initializing the assessment of health includes:

identifying a plurality of computing nodes within the cluster of computing nodes that are in an idle state;

assigning at least a subset of computing nodes of the plurality of computing nodes in the idle state to a queue for testing a state of health of each of the subset of computing nodes;

defining a plurality of pairings of computing nodes based on the subset of computing nodes, wherein each pairing of computing nodes of the plurality of pairings of computing nodes includes a distinct paired combination of computing nodes selected from the subset of computing nodes;

executing the assessment of health against the plurality of pairings of computing nodes, wherein the executing the assessment of health includes:

implementing a bi-directional testing by each pairing of computing nodes of the plurality of pairing of computing nodes, wherein each pairing of computing nodes executes one or more node health tests based on testing communications between nodes defining each respective pairing of computing nodes of the plurality of pairings of computing nodes;

obtaining assessment data based on the execution of the assessment of health by the plurality of pairings of computing nodes, wherein the assessment data includes efficacy metrics for each pairing of computing nodes of the plurality of pairings of computing nodes, the efficacy metrics relating to a value of a data processing performance or a value of a data transmission performance of each pairing of computing nodes resulting from the execution of the one or more node health tests;

identifying as likely unhealthy nodes one or more computing nodes failing to satisfy one or more health efficacy thresholds based on the assessment data; and altering a state of the one or more computing nodes identified as likely unhealthy nodes from an online state to an offline state thereby mitigating a likely degradation of the cluster of computing nodes.

10. The computer-implemented method according to claim 9, wherein the one or more health efficacy thresholds relates to one or more minimum expected efficacy values for the value of the data processing performance or the value of the data transmission performance.

11. The computer-implemented method according to claim 9, wherein implementing the bi-directional testing of the plurality of pairings of computing nodes includes:

establishing a testing channel between the nodes of each respective pairing of computing nodes of the plurality of pairings of computing nodes; and execute one or more node health tests by transmitting data associated with the execution of the one or more node health tests via the testing channel of each respective pairing of computing nodes of the plurality of pairings of computing nodes.

12. The computer-implemented method according to claim 9, wherein altering the state of the one or more computing nodes identified as likely unhealthy further includes marking the one or more computing nodes for a fault verification process that identifies a distinct hardware component contributing to the identification of the one or more computing nodes as likely unhealthy.

13. The computer-implemented method according to claim 9, further comprising:

routing the one or more computing nodes to a fault characterization process based on the identification of the one or more computing nodes as likely unhealthy;

identifying by the fault characterization process one or more hardware components failing to satisfy one or more hardware performance standards; and characterizing a fault of the one or more computing nodes based on the identified one or more hardware components failing to satisfy the one or more hardware performance standards.

14. The computer-implemented method according to claim 9, wherein:

the queue for testing the state of health of each of the subset of computing nodes is encoded for testing of two or more nodes of the subset of computing nodes in a plurality of testing cycles, and for each testing cycle of the plurality of testing cycles, a group of potentially unhealthy nodes is identified.

15. The computer-implemented method according to claim 14, wherein the assessment of health further includes:

identifying the one or more computing nodes that are shared or common to two or more groups of potentially unhealthy nodes, wherein the identification of the one or more computing nodes as likely unhealthy nodes if further based on the one or more computing nodes being shared or common to the two or more groups of potentially unhealthy nodes.

16. The computer-implemented method according to claim 9, wherein:

the cluster of computing nodes includes a plurality of diverse computing nodes having varying hardware components, the executing the assessment of health further includes identifying a homogeneous group of computing nodes of the cluster of computing nodes, the homogeneous group of computing nodes relating to computing nodes having a same processing component or a same network interconnect component, and identifying the plurality of computing nodes that are in the idle state are selected from within the homogeneous group of computing nodes of the cluster of computing nodes.

17. The computer-implemented method according to claim 9, further comprising:

generating benchmark data based on using one or more health tests to evaluate a subset of computing nodes of the cluster of computing nodes before executing the assessment of health, wherein the benchmark data includes one or more expected values of performance for a given computing node identified as a healthy node.

18. A computer-program product embodied in a non-transitory machine-readable storage medium storing computer instructions that, when executed by one or more processors, perform operations comprising:

implementing an assessment interface in operable command communication with an administrative computing node of a cluster of computing nodes, the administrative computing node being network to computing nodes of the cluster of computing nodes for implementing an assessment of health;

identifying a quora of computing nodes of the cluster of computing nodes, the quora of computing nodes including a subset of computing nodes within the cluster of computing nodes having hardware components that are homogeneous;

signaling, via the assessment interface, the administrative computing node to cause the quora of computing nodes to execute the assessment of health, wherein executing the assessment of health includes:

defining, for each test cycle of a plurality of test cycles of the assessment of health, a plurality of distinct pairs of computing nodes from the quora of computing nodes, wherein each test cycle of the assessment of health assesses a different combination of paired computing nodes of the plurality of distinct pairs of computing nodes;

implementing a bi-directional testing by each pair of computing nodes of the plurality of distinct pairs of computing nodes;

evaluating bi-directional testing data obtained based on the execution of the assessment of health of the quora of computing nodes;

designating at least one computing node of the quora of computing nodes as unhealthy when the evaluation indicates that a subset of the bi-directional testing data associated with the at least one computing node fails to satisfy one or more benchmark node performance values; and altering the quora of computing nodes by removing the designated unhealthy computing node to mitigate a likely performance degradation of the cluster of computing nodes.

19. The computer-program product according to claim 18, the non-transitory machine-readable storage medium storing computer instructions that, when executed by one or more processors, perform operations further comprising:

ordering the plurality of distinct pairs of computing nodes based on descending performance metrics;

applying the one or more benchmark node performance values against the ordering of the plurality of distinct pairs of computing nodes, wherein classifying the at least one computing node of the quora of computing nodes as unhealthy is based on the application of the one or more benchmark node performance values against the ordering of the plurality of distinct pairs of computing nodes.

20. The computer-program product according to claim 18, wherein the assessment of health comprises a drop out and accumulation health assessment that per iteration of the assessment of health against the quora of computing nodes:

drops out a given computing node as identified as unhealthy from the quora of computing nodes by altering the quora of computing nodes to exclude the given computing node, and accumulates computing nodes not identified as unhealthy within the quora of computing nodes by maintaining member computing nodes of the quora of computing nodes to a subsequent iteration of the assessment of health.

* * * * *